(12) United States Patent
Horiuchi et al.

(10) Patent No.: US 11,777,750 B2
(45) Date of Patent: Oct. 3, 2023

(54) TERMINAL AND COMMUNICATION METHOD

(71) Applicant: Panasonic Intellectual Property Corporation of America, Torrance, CA (US)

(72) Inventors: Ayako Horiuchi, Kanagawa (JP); Hidetoshi Suzuki, Kanagawa (JP); Lilei Wang, Beijing (CN); Takashi Iwai, Ishikawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 23 days.

(21) Appl. No.: 17/203,441

(22) Filed: Mar. 16, 2021

(65) Prior Publication Data
US 2021/0203541 A1    Jul. 1, 2021

Related U.S. Application Data

(63) Continuation of application No. 16/320,426, filed as application No. PCT/CN2016/094142 on Aug. 9, 2016, now Pat. No. 10,985,966.

(51) Int. Cl.
*H04W 28/02* (2009.01)
*H04L 9/40* (2022.01)

(52) U.S. Cl.
CPC .......... *H04L 9/40* (2022.05); *H04W 28/0273* (2013.01)

(58) Field of Classification Search
CPC .......... H04W 28/0273; H04W 52/346; H04W 28/02; H04W 52/14; H04W 52/18; H04W 52/34; H04W 72/04; H04L 9/40
See application file for complete search history.

(56) References Cited

U.S. PATENT DOCUMENTS 10,361,833 B2 *   7/2019   Chen ................ H04L 5/0057
10,750,533 B2 *   8/2020   Lee ................... H04W 72/23
(Continued)

FOREIGN PATENT DOCUMENTS

WO         2017/110962 A1    6/2017

OTHER PUBLICATIONS

3GPP TS 36.211 V13.0.0, "3rd Generation Partnership Project; Technical Specification Group Radio Access Network; Evolved Universal Terrestrial Radio Access (E-UTRA); Physical channels and modulation (Release 13)," Dec. 2015, 142 pages.

(Continued)

*Primary Examiner* — Nathan S Taylor
(74) *Attorney, Agent, or Firm* — Seed IP Law Group LLP

(57) ABSTRACT

A terminal includes circuitry and a transmitter. The circuitry, in operation, determines a first transmission power for a first uplink signal and a second transmission power for a second uplink signal by prioritizing allocation of a transmission power to the second transmission power for the second uplink signal, responsive to, in a first transmission time interval (TTI) where the first uplink signal is transmitted, the second uplink signal being transmitted in a second TTI that is shorter than the first TTI. The transmitter, in operation, transmits the first uplink signal with the determined first transmission power and transmits the second uplink signal with the determined second transmission power.

11 Claims, 8 Drawing Sheets

(56) References Cited

U.S. PATENT DOCUMENTS

| | | | |
|---|---|---|---|
| 2012/0057547 A1* | 3/2012 | Lohr | H04W 52/146 370/329 |
| 2015/0071065 A1* | 3/2015 | Terry | H04W 28/24 370/230 |
| 2015/0334685 A1* | 11/2015 | Ji | H04W 72/1247 370/330 |
| 2016/0353393 A1* | 12/2016 | Feuersaenger | H04W 52/281 |
| 2017/0013565 A1* | 1/2017 | Pelletier | H04W 52/146 |
| 2017/0290004 A1* | 10/2017 | Yang | H04W 72/0446 |
| 2018/0077658 A1* | 3/2018 | Nory | H04W 72/1284 |
| 2018/0176938 A1* | 6/2018 | Shao | H04W 72/0493 |
| 2018/0199314 A1* | 7/2018 | Takeda | H04L 1/1822 |
| 2018/0213489 A1* | 7/2018 | Andou | H04W 72/04 |
| 2018/0227861 A1* | 8/2018 | Byun | H04W 72/0473 |
| 2019/0028975 A1* | 1/2019 | Nory | H04L 1/1861 |
| 2019/0044639 A1* | 2/2019 | Ouchi | H04W 52/18 |
| 2019/0069253 A9* | 2/2019 | Nory | H04W 74/0833 |
| 2019/0098622 A1* | 3/2019 | Lee | H04W 52/365 |
| 2019/0116611 A1* | 4/2019 | Lee | H04W 72/1284 |
| 2019/0159138 A1* | 5/2019 | Lee | H04W 52/146 |
| 2019/0174430 A1* | 6/2019 | Gao | H04W 52/48 |
| 2019/0268855 A1* | 8/2019 | Kim | H04W 52/367 |
| 2021/0168843 A1 | 6/2021 | Takeda et al. | |

OTHER PUBLICATIONS

Ericsson et al., "New SI proposal: Study on Latency reduction techniques for LTE," RP-150465, Agenda Item: 13.1.2, 3GPP TSG RAN Meeting #67, Shanghai, China, Mar. 9-12, 2015, 7 pages.

International Search Report, dated Mar. 24, 2017, for International Application No. PCT/CN2016/094142, 2 pages.

Nokia et al., "Simultaneous Transmissions of UL Signals for Shortened TTI Operation," R1-164923, Agenda Item: 6.2.10.1, 3GPP TSG RAN WG1 Meeting #85, Nanjing, China, May 23-27, 2016, 5 pages.

* cited by examiner

TERMINAL AND COMMUNICATION METHOD

BACKGROUND

Technical Field

The present disclosure relates to a terminal and a communication method.

Description of the Related Art

In recent years, the development of applications that require delay time reduction (delay critical) has been considered. Examples of such applications that require delay time reduction include autonomous vehicle driving, augmented reality applications in smart glasses, or inter-machine communication.

In 3GPP, in order to develop these applications, latency reduction for reducing the packet data latency has been studied (see Non-Patent Literature (hereinafter, referred to as "NPL") 1). In latency reduction, shortening (reducing) the length of a transmission time interval (TTI) (TTI length), which is the time unit for transmission and reception of data, to be a time length between 0.5 msec and one orthogonal frequency division multiplexing (OFDM) symbol has been considered. Note that, the traditional TTI length is 1 msec, which is equal to the unit called "subframe." One subframe is composed of two slots (one slot is equal to 0.5 msec). One slot is composed of seven OFDM symbols for normal cyclic prefix (CP) or of six OFDM symbols for extended CP. For example, when the reduced TTI length is 0.5 msec (=1 slot), two TTIs are set per msec. When one slot is divided into a TTI composed of four OFDM symbols and a TTI composed of three OFDM symbols, four TTIs are set per msec. When the TTI length is two OFDM symbols, seven TTIs are set per msec.

Shortening the TTI length makes it possible to reduce latency for CQI reporting and thus to increase the frequency of CQI reporting, which brings an advantage in that the difference between CQI reporting and actual channel quality is reduced.

CITATION LIST

Non-Patent Literature

NPL 1

RP-150465, "New SI proposal: Study on Latency reduction techniques for LTE," Ericsson, Huawei, March 2015

NPL 2

3GPP TS 36.211 V13.0.0, "Physical channels and modulation (Release 13)," December 2015

NPL3

R1-164923, "Simultaneous Transmission of UL Signals for Shortened TTI Operation," Nokia, Alcatel-Lucent Shanghai Bell, May 2016

BRIEF SUMMARY

Shortening of a TTI length, for example, can be applied not only to systems extending Long Term Evolution (LTE), but also to systems implemented using a new frame format called New Radio Access Technology (RAT). In New RAT, the number of symbols per msec may be different from the number of symbols in the above-mentioned LTE systems. In operation of short TTIs each formed by shortening the TTI length (hereinafter, such a TTI is called an "sTTI"), supporting multiple TTI lengths simultaneously may be considered (e.g., see NPL 3). Supporting multiple TTI lengths enables selectively using the respective TTI lengths in accordance with requirements from different applications. For example, a long TTI length is used for a delayable packet while an sTTI can be used for a delay-critical packet.

However, simultaneously transmitting packets using multiple TTIs having different TTI lengths when the maximum transmission power usable for a certain terminal (may be called "UE") is not sufficient causes a problem of running out of transmission power. Thus, studies need to be carried out on the distribution of transmission power for different TTI lengths.

An aspect of this disclosure is to provide a terminal and a communication method capable of appropriately configuring distribution of transmission power when TTI lengths are different.

A terminal according to an aspect of the present disclosure includes: a transmission-power determining section that determines transmission power for an uplink signal in a first transmission time interval (TTI) (first TTI uplink signal) and an uplink signal in a second TTI shorter in TTI length than the first TTI (second TTI uplink signal), when the second TTI uplink signal occurs during transmission of an uplink signal in a first interval in which a first reference signal is referenced in the first TTI, so as to keep the transmission power for the first reference signal and the first TTI uplink signal constant without allocating any transmission power to the second TTI uplink signal in the first interval, and to reduce the transmission power for the first TTI uplink signal to allocate transmission power to the second TTI uplink signal in a second interval which is subsequent to the first interval in the first TTI and in which a second reference signal is referenced; and a transmission section that transmits the first TTI and the second TTI uplink signals using the determined transmission power.

A communication method according to an aspect of the present disclosure includes: determining transmission power for an uplink signal in a first transmission time interval (TTI) (first TTI uplink signal) and an uplink signal in a second TTI shorter in TTI length than the first TTI (second TTI uplink signal), when the second TTI uplink signal occurs during a first interval in which a first reference signal is referenced in the first TTI, so as to keep the transmission power for the first reference signal and the first TTI uplink signal constant without allocating any transmission power to the second TTI uplink signal in the first interval, and to reduce the transmission power for the first TTI uplink signal to allocate transmission power to the second TTI uplink signal in a second interval which is subsequent to the first interval in the first TTI and in which a second reference signal is referenced; and transmitting the first TTI and the second TTI uplink signals using the determined transmission power.

Note that the comprehensive or specific aspects mentioned above may be implemented by a system, apparatus, method, integrated circuit, computer program, or recoding medium, or any combination of the system, apparatus, method, integrated circuit, computer program, and recoding medium.

According to an aspect of this disclosure, distribution of transmission power when TTI lengths are different can be appropriately configured.

The specification and drawings reveal more advantages and effects in an aspect of this disclosure. Such advantages and/or effects are provided by the features disclosed in several embodiments as well as the specification and draw-

DETAILED DESCRIPTION

Background to Aspect of the Present Disclosure

Hereinafter, a description will be given of the background of an aspect of the present disclosure.

Operation of Dual Connectivity

In dual connectivity, a terminal is allowed to transmit uplink (UL) signals in multiple cells simultaneously. Each cell belongs to a master cell group (MCG) or a secondary cell group (SCG) and is capable of determining priorities and distributing transmission power for MCG UL transmission and SCG UL transmission. In addition, each cell group (CG) includes one primary cell (PCell) and one or more secondary cells (SCell(s)). In dual connectivity, a random access channel (RACH) to be transmitted to PCell of MCG is given a top priority, and priorities are then given to the respective channels as follows:

HARQ-ACK=SR>CSI>PUSCH without UCI

Moreover, when the same channel is transmitted in MCG and SCG, MCG UL transmission is given priority over SCG UL transmission.

Assumption

As the power distribution for UL transmission, minimum guaranteed power is allocated to each CG in dual connectivity. When using transmission power equal to or greater than the minimum guaranteed power, the terminal can use remaining transmission power (remaining power). Meanwhile, as the power distribution to be applied when MCG and SCG are not in synchronization, there is a method in which the transmission power for a signal that has transmitted earlier does not change.

Figure 1:
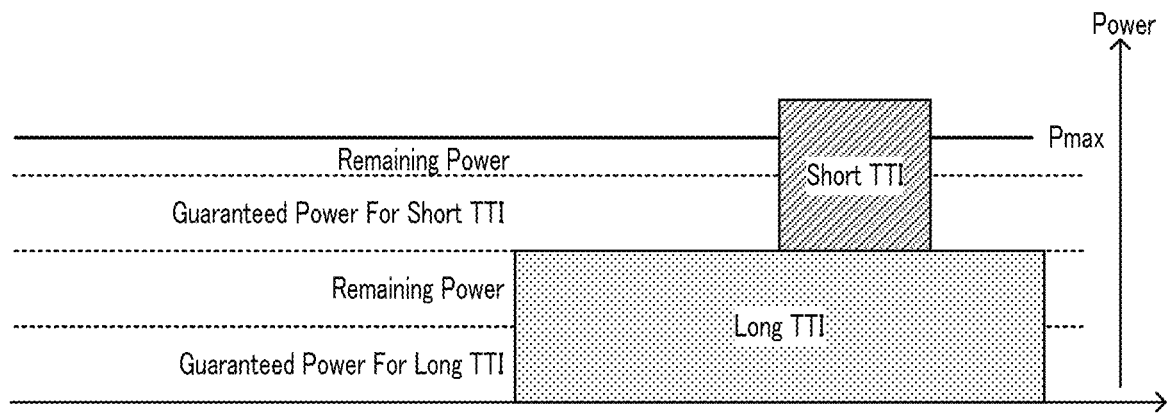
FIG. 1 is a diagram illustrating an example of power distribution between TTIs having different TTI lengths.

For the power distribution between TTIs when multiple TTI lengths are supported simultaneously, as in dual connectivity, namely, a method in which the minimum guaranteed power is allocated while each TTI is regarded as a cell group is also considered (e.g., see FIG. 1). For example, when transmission power equal to or greater than the minimum guaranteed transmission power is needed in each TTI, a method in which the remaining power is distributed according to the priorities or a method in which the remaining power can be used for a TTI signal which has been transmitted earlier is considered.

As a power distribution method used when multiple TTIs having different TTI lengths co-exist, the following methods are available. Note that, hereinafter, the TTIs having different TTI lengths are called a long TTI (or simply TTI) and a short TTI (sTTI), respectively.

Method 1: Priorities are determined first based on channel types, and then, for the same channel, priorities are determined based on TTI lengths.

Method 2: Priorities are determined first based on TTI lengths, and then, priorities are determined based on channel types.

Method 3: Power required for a signal that has been transmitted earlier can be used.

For the priorities in accordance with channel types in Methods 1 and 2, the following priorities are considered: RACH>HARQ-ACK=SR>CSI>PUSCH without UCI. RACH is given a high priority because RACH is the information required for connecting communication or acquiring synchronization. Regarding HARQ-ACK, a reception failure may cause unnecessary HARQ retransmission for downlink (DL) data or causes retransmission in higher layers without HARQ retransmission although the retransmission is required. For this reason, HARQ-ACK is given a high priority. Scheduling Request (SR) is the information required for starting UL communication, so that SR is given a high priority. Meanwhile, Physical Uplink Shared Channel (PUSCH) without Uplink Control Information (UCI) is given a low priority because UL data may be retransmitted when the reception quality of UL data becomes poor, and no large impact is given to the system. However, when the priority of UL data is higher than that of DL data, for example, the priority of PUSCH may be raised over HARQ-ACK.

For the priorities in accordance with the TTI lengths, an sTTI is preferably given a priority when a packet whose delay is to be reduced is transmitted in an sTTI while a delayable packet is transmitted in a TTI. Meanwhile, it is preferable to give a priority to a TTI when a decrease in channel quality causes switching to a TTI although an sTTI is in use. The priorities in accordance with the TTI lengths may be predetermined in the system, or a base station (may be called an "eNB") may notify a terminal of the information indicating which TTI length is given priority.

In Method 1, priorities are determined in accordance with channel types, first, and for the same channel, which TTI length among a TTI and sTTI is given priority may be determined for each channel.

Problems

When UL signals in multiple TTIs having different TTI lengths are transmitted simultaneously, there is a possibility that a UL signal in an sTTI (hereinafter, may be referred to as "sTTI UL signal") is assigned and transmitted after transmission of a UL signal in a long TTI (hereinafter, referred to as "long TTI UL signal") starts. In this case, there arises a problem in that, since the power is already allocated to the long TTI UL signal, although the sTTI UL signal is given a higher priority than the long TTI UL signal, the power to be allocated to the sTTI UL signal becomes short when there is not much remaining power.

Meanwhile, as in SR, when a terminal voluntarily transmits a signal in an sTTI rather than assignment from a base station, there arises a problem in that the power to be allocated to an sTTI UL signal becomes short when power is already allocated to a long TTI UL signal. In particular, there arises a problem in that a delay in SR has an impact on a delay in TCP ACK transmission and causes a decrease in user throughput. In order to give priority to an sTTI, an increase in the guaranteed power for sTTIs is possible, but the problem is that the power to be allocated to TTIs becomes always small.

In the method in which the UL signal that has transmitted earlier uses the remaining power without determination of priorities in accordance with TTI lengths, there arises an imbalance in which long TTIs use the remaining power more often than sTTIs.

In this respect, an object of an aspect of this disclosure is to appropriately perform power distribution when UL signals in different TTI lengths are transmitted.

Hereinafter, a detailed description will be given of embodiments of the present disclosure with reference to the drawings.

Summary of Communication System A communication system according to each embodiment of the present disclosure includes base station 100 and terminal 200.

Figure 2:
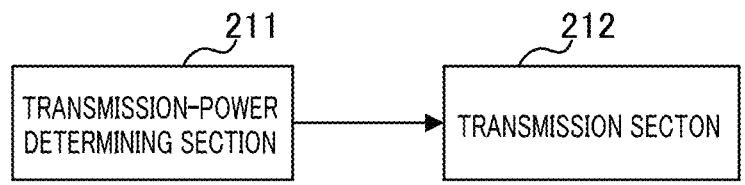
FIG. 2 is a block diagram illustrating a main configuration of a terminal according to Embodiment 1.

FIG. 2 is a block diagram illustrating a main configuration of terminal 200 according to an embodiment of the present disclosure. In terminal 200 illustrated in FIG. 2, transmission-power determining section 211 is configured to determine transmission power for an uplink signal in a first transmission time interval (TTI) and an uplink signal in a second TTI in such a manner that, when an uplink signal in the second TTI shorter in TTI length than the first TTI occurs during transmission of the uplink signal in a first interval in which a first reference signal is referenced in the first TTI, the transmission power for the uplink signals in the first TTI and the second TTI in such a way that the transmission power for the first reference signal and the uplink signal in the first TTI is kept constant while no transmission power is allocated to the uplink signal in the first interval, and in a second interval which is subsequent to the first interval and in which a second reference signal is referenced, the transmission power for the uplink signal in the first TTI is reduced for allocation of the transmission power to the uplink signal in the second TTI. Transmission section 212 transmits the uplink signals in the first TTI and the second TTI with the determined transmission power.

Embodiment 1

Configuration of Base Station

Figure 3:
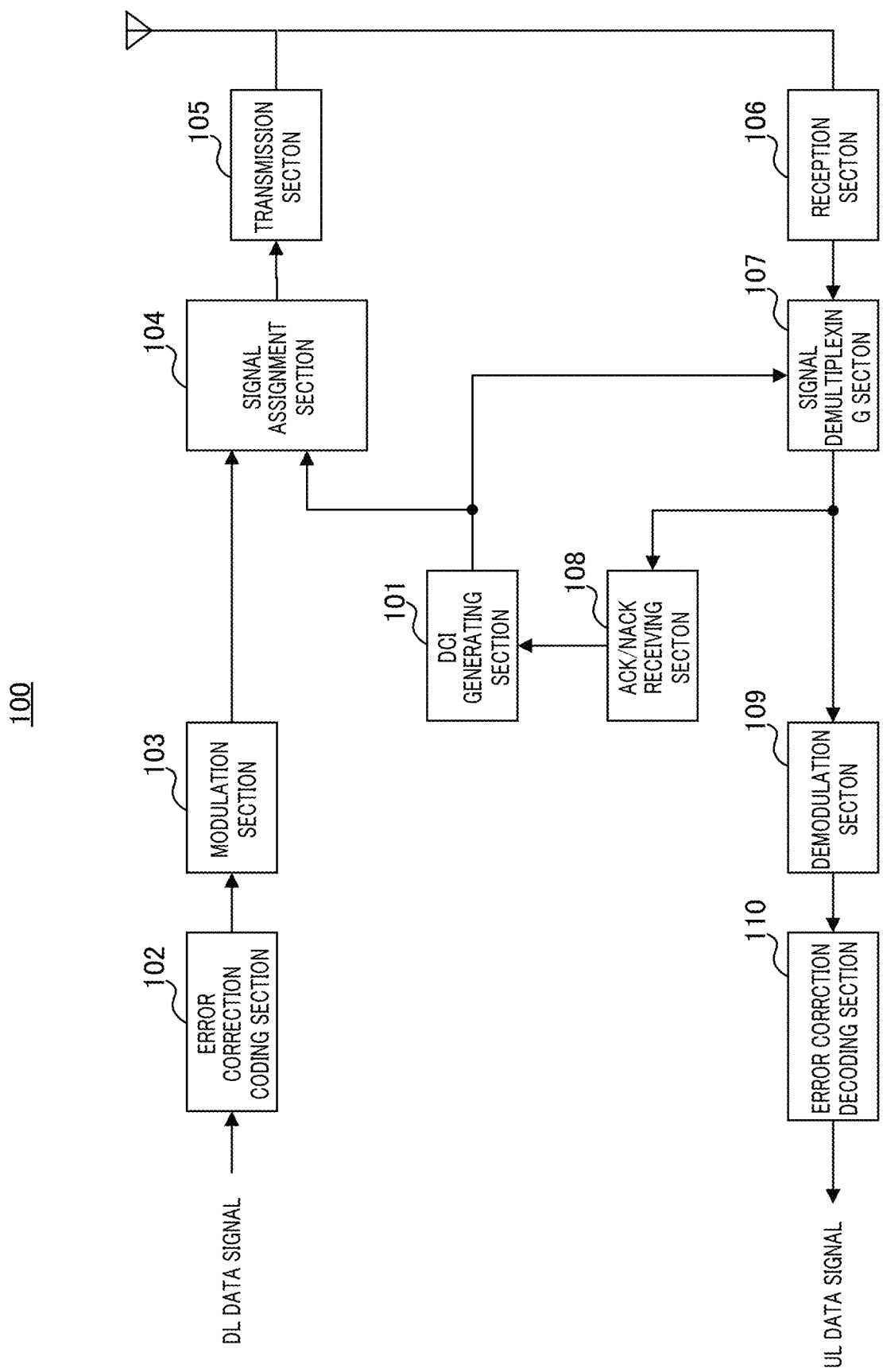
FIG. 3 is a block diagram illustrating a configuration of a base station according to Embodiment 1.

FIG. 3 is a block diagram illustrating a configuration of base station 100 according to Embodiment 1. In FIG. 3, base station 100 includes DCI generating section 101, error correction coding section 102, modulation section 103, signal assignment section 104, transmission section 105, reception section 106, signal demultiplexing section 107, ACK/NACK receiving section 108, demodulation section 109, and error correction decoding section 110.

DCI generating section 101 determines whether to transmit a transmission data signal (DL data signal) in an sTTI or a TTI or both. In addition, DCI generating section 101 determines based on power information of terminal 200 received from error correction decoding section 110 whether to receive a UL data signal using an sTTI or a TTI or both. DCI generating section 101 determines based on the content (ACK or NACK) of an ACK/NACK signal received from ACK/NACK receiving section 108, (i.e., ACK/NACK signal for a DL data signal (PDSCH)) whether retransmission of the DL data signal is necessary, and then generates, in accordance with the result of determination, a DCI for sTTI or a DCI for TTI. DCI generating section 101 outputs a DL related control signal (such as resource allocation information) to signal assignment section 104 and outputs a UL related control signal (such as resource allocation information) to signal demultiplexing section 107. Moreover, DCI generating section 101 outputs the generated DCI to signal assignment section 104 for transmission of the DCI to terminal 200.

Error correction coding section 102 performs error correction coding on the transmission data signal (DL data signal) and the higher layer signaling (not illustrated) and outputs the coded signal to modulation section 103.

Modulation section 103 applies modulation processing on the signal received from error correction coding section 102 and outputs the modulated signal to signal assignment section 104.

Signal assignment section 104 assigns, to a predetermined downlink resource, on the basis of the DL control signal input from DCI generating section, the signal received from modulation section 103 and the DCI received from DCI generating section 101. A transmission signal is formed in this manner. The transmission signal thus formed is output to transmission section 105.

Transmission section 105 performs radio transmission processing such as up-conversion on the transmission signal input from signal assignment section 104 and transmits the processed signal to terminal 200 via an antenna.

Reception section 106 receives via an antenna the signal transmitted from terminal 200 and performs radio reception processing such as down-conversion on the received signal, and outputs the processed signal to signal demultiplexing section 107.

Signal demultiplexing section 107 identifies the reception frequency and temporal timing for the UL data signal and ACK/NACK signal on the basis of the UL control signal input from DCI generating section 101. Signal demultiplexing section 107 demultiplexes the UL data signal from the received signal and outputs the acquired signal to demodulation section 109 while demultiplexing the ACK/NACK signal from the received signal and outputs the acquired signal to ACK/NACK receiving section 108.

ACK/NACK receiving section 108 outputs the content (ACK or NACK) of the ACK/NACK signal for the DL data signal, which is input from signal demultiplexing section 107, to DCI generating section 101.

Demodulation section 109 performs demodulation processing on the signal input from signal demultiplexing section 107 and outputs the signal thus acquired to error correction decoding section 110.

Error correction decoding section 110 decodes the signal input from demodulation section 109 to acquire the received data signal (UL data signal) from terminal 200. Error correction decoding section 110 outputs power information of terminal 200 indicated by an higher layer, in the received data signal to DCI generating section 101.

Configuration of Terminal

Figure 4:
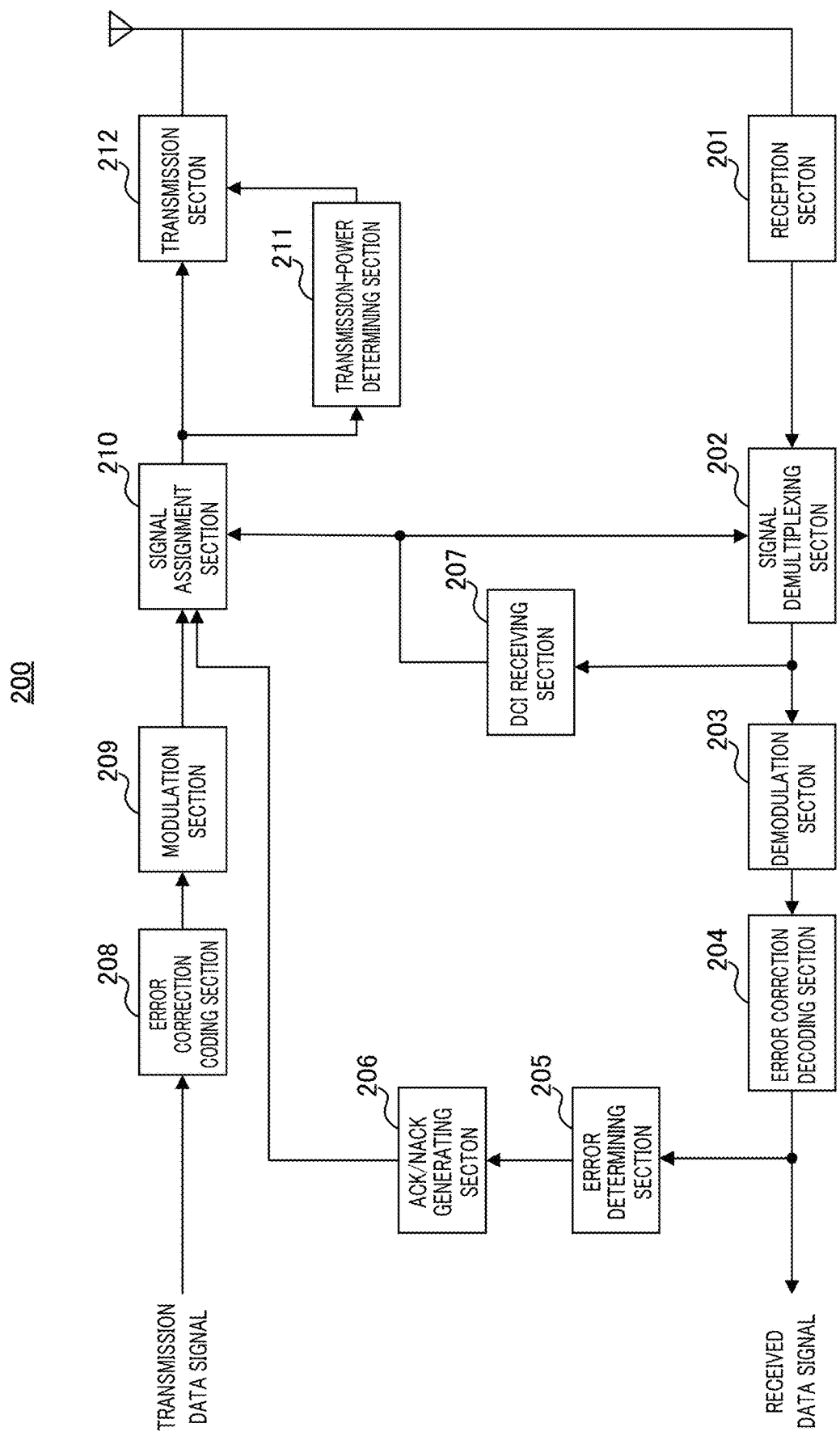
FIG. 4 is a block diagram illustrating a configuration of the terminal according to Embodiment 1.

FIG. 4 is a block diagram illustrating a configuration of terminal 200 according to Embodiment 1. In FIG. 4, terminal 200 includes reception section 201, signal demultiplexing section 202, demodulation section 203, error correction decoding section 204, error determination section 205, ACK/NACK generating section 206, DCI receiving section 207, error correction coding section 208, modulation section 209, signal assignment section 210, transmission-power determining section 211, and transmission section 212.

Reception section 201 receives a received signal via an antenna and performs reception processing such as down-conversion on the received signal and outputs the processed signal to signal demultiplexing section 202.

Signal demultiplexing section 202 demultiplexes a signal mapped to a resource to which a DCI is possibly assigned, and outputs the acquired signal to DCI receiving section 207. In addition, signal demultiplexing section 202 demultiplexes a DL data signal from the received signal on the basis of the DL related control signal (resource allocation information) input from DCI receiving section 207 and outputs the acquired signal to demodulation section 203.

Demodulation section 203 demodulates the signal received from signal demultiplexing section 202 and outputs the demodulated signal to error correction decoding section 204.

Error correction decoding section 204 decodes the demodulation signal received from demodulation section 203 and outputs the acquired received data signal. Moreover, error correction decoding section 204 outputs the received data signal to error determination section 205.

Error determination section 205 detects whether the received data signal has an error using cyclic redundancy check (CRC) and outputs the detection result to ACK/NACK generating section 206.

ACK/NACK generating section 206 generates, on the basis of the detection result of the received data signal, which is input from error determination section 205, an ACK when there is no error, or a NACK when there is an error, and outputs the generated ACK/NACK signal to signal assignment section 210.

DCI receiving section 207 outputs a DL related control signal (such as resource allocation information) indicated by the DCI (DCI for TTI or DCI for sTTI) received from signal demultiplexing section 202 and then outputs a UL related control signal (such as resource allocation information) to signal assignment section 210.

Error correction coding section 208 performs error correction coding on the transmission data signal (UL data signal) and outputs the coded data signal to modulation section 209.

Modulation section 209 modulates the data signal received from error correction coding section 208 and outputs the modulated data signal to signal assignment section 210.

Signal assignment section 210 assigns the data signal input from modulation section 209 to a resource on the basis of the UL related control signal (resource allocation information) received from DCI receiving section 207 and outputs the resultant signal to transmission section 212. In addition, signal assignment section 210 assigns the ACK/NACK signal input from ACK/NACK generating section 206 to an ACK/NACK resource or multiplexes the ACK/NACK signal to the UL data signal and outputs the resultant signal to transmission section 212.

Transmission-power determining section 211 determines the transmission power in accordance with the priority for the transmission signal and ACK/NACK signal input from signal assignment section 210. For example, when an sTTI UL signal given a high priority occurs after allocation of transmission power to a long TTI UL signal, transmission-power determining section 211 changes the transmission power for the UL signal in a long TTI during the transmission. Transmission-power determining section 211 outputs power information indicating the determined transmission power to transmission section 212. Note that, transmission-power determining section 211 may indicate power 0 when no power to be allocated for the UL signal.

Note that, the amount of resource to be allocated in signal assignment section 210 is reduced for the signal for which transmission-power determining section 211 has indicated reducing the transmission power.

Transmission section 212 configures transmission power based on the transmission power information input from transmission-power determining section 211, performs transmission processing such as up-conversion on the signal input form signal assignment section 210 and the power information input from transmission-power determining section 211, and transmits the processed signal and information via an antenna. Accordingly, the long TTI and sTTI UL signals are transmitted with the transmission power determined by transmission-power determining section 211.

Operations of Base Station 100 and Terminal 200

The operations of base station 100 and terminal 200 each configured in the manner described above will be described in detail.

Hereinafter, a description will be given of Operation Examples 1-1 and 1-2 according to Embodiment 1.

Operation Example 1-1

Operation Example 1-1 assumes a normal LTE operation with an LTE system as the basis in a long TTI while the long TTI is set to 1 msec, which is the subframe length in LTE.

In addition, in Operation Example 1-1, regardless of TTI lengths, the priorities for UL channels are set as follows: HARQ-ACK=SR>CSI>PUSCH without UCI.

Moreover, a description will be herein given of an example in which, during transmission of a long TTI UL signal (e.g., PUSCH/PUCCH), an sTTI UL signal given a higher priority than the long TTI UL signal (e.g., SR) occurs.

When an sTTI SR occurs during transmission of a long TTI UL signal, terminal 200 checks transmission power (remaining power) allocatable to the SR. When determining that the transmission power required for SR transmission is allocatable, terminal 200 transmits the SR at an optional timing.

Meanwhile, when the transmission power required for SR transmission is not allocatable, terminal 200 waits until a timing at which the transmission power for the long TTI UL signal is changeable and transmits the SR at or after the timing.

First, a description will be given of a case where terminal 200 transmits PUCCH using a long TTI.

For PUCCH, a physical resource block (PRB) for transmission changes per slot and orthogonal coding is also applied in units of slots, so that the transmission power for PUCCH is changed in units of slots. Accordingly, even when the transmission power is changed in units of slots, the orthogonality of the signal can be kept the same. Stated differently, the timing at which transmission power for a long TTI PUCCH can be changed is a timing of a boundary between slots.

In this respect, when sufficient transmission power cannot be allocated to an sTTI SR, terminal 200 waits until the next slot in which transmission power for the long TTI can be changed, and transmits the SR in the sTTI placed in the next slot.

Figure 5:
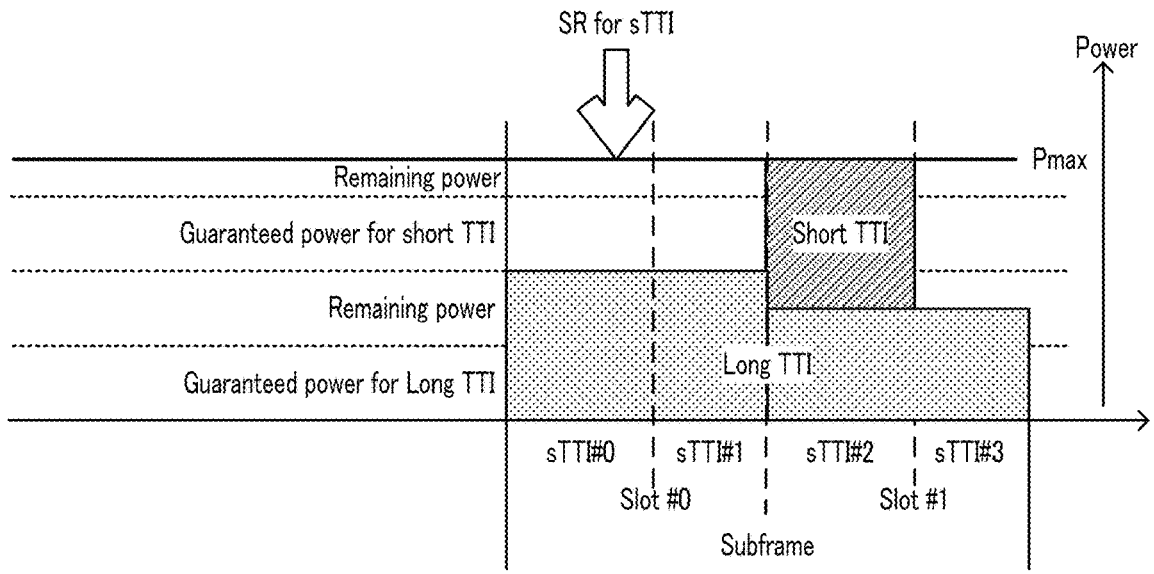
FIG. 5 is a diagram illustrating an example of transmission power control according to Operation Example 1-1 of Embodiment 1.

FIG. 5 illustrates an example of transmission power control for a long TTI and sTTIs (power distribution) according to Operation Example 1-1. In FIG. 5, four sTTIs (sTTI #0 to #3) per subframe (1 msec) are placed. In addition, an SR sTTI occurs in the interval of sTTI #0 in FIG. 5.

Moreover, FIG. 5 illustrates the state in which the transmission power required for SR transmission cannot be allocated even by combining the minimum guaranteed power for sTTI and the remaining power not used in a long TTI PUCCH together in sTTI #0 (in the interval of slot #0).

In this case, terminal 200 waits until the boundary of the slot in which the transmission power for the long TTI PUCCH can be changed, and then transmits the SR in slot #1, which is the next slot. More specifically, as illustrated in FIG. 5, terminal 200 waits in the interval of slot #0 (i.e., sTTI #0 and sTTI #1) without transmitting the sTTI SR that has occurred in the interval of slot #0 (sTTI #0) in the long TTI. Terminal 200 then transmits the SR in sTTI #2 within the interval of slot #1.

In this case, terminal 200 keeps the transmission power for the long TTI PUCCH constant without any change within slot #0 in which the sTTI SR has occurred.

Terminal 200 reduces the transmission power for the long TTI PUCCH in order to secure the transmission power required for transmission of the sTTI SR in slot #1. In other words, terminal 200 determines the transmission power for the long TTI and sTTI UL signals so as to reduce the transmission power for the long TTI PUCCH to allocate the transmission power to the sTTI SR.

Note that, terminal 200 keeps the transmission power for the long TTI PUCCH the same transmission power as that for sTTI #2 even in the interval of sTTI #3 after the SR transmission in sTTI #2 ends. In other words, PUCCH is transmitted with the constant transmission power in slot #1.

Accordingly, the transmission power for PUCCH is changed in units of slots due to allocation of power to the sTTI SR. Thus, terminal 200 can allocate sufficient transmission power to the sTTI SR given a high priority, while securing the reception quality characteristics for the long TTI PUCCH. More specifically, terminal 200 can simultaneously transmit the long TTI PUCCH and the sTTI SR with appropriate transmission power in sTTI #2 (slot #1). Stated differently, terminal 200 can transmit an sTTI SR even during transmission of a long TTI PUCCH. Thus, terminal 200 can suppress delay in transmission of sTTI SR.

Next, a description will be given of a case where terminal 200 transmits PUSCH using a long TTI.

In a case where the modulation scheme of a PUSCH is one that does not use amplitude (such as BPSK/QPSK), changing the transmission power for PUSCH even during transmission has no impact on demodulation of the PUSCH in base station 100.

In this respect, when an sTTI SR occurs during transmission of PUSCH using a long TTI, terminal 200 transmits the SR with the transmission power required for SR transmission without waiting. During this transmission, terminal 200 reduces the transmission power for the long TTI PUSCH during the SR transmission interval in order to secure the transmission power required for the SR transmission. Thus, terminal 200 can transmit the sTTI SR with appropriate transmission power without delay and without any impact on the reception quality characteristics of the long TTI PUSCH.

Meanwhile, when the modulation scheme for PUSCH is a multilevel modulation scheme using amplitude (such as 16 QAM, 64 QAM, and 256 QAM), changing the transmission power for PUSCH during transmission causes a problem in that a power difference between the reference signal (demodulation reference signal (DMRS)) and the received data occurs in base station 100, so that the received data cannot be modulated accurately.

In this respect, the following two methods are considered for the transmission power control (power distribution) method used when the modulation scheme for the long PUSCH is a multilevel modulation scheme using amplitude (such as 16 QAM, 64 QAM, and 256 QAM).

The first method is a method in which, when there is a possibility that an sTTI UL signal and a long TTI UL signal are simultaneously transmitted, for the long TTI, modulation processing is performed with each slot closed (independently) without sharing a reference signal between slots in base station 100.

Accordingly, it is made possible to change the transmission power for the long TTI UL signal between slots. More specifically, as in the case of PUCCH described above, when the transmission power required for SR transmission cannot be allocated in a certain slot (e.g., slot #0 in FIG. 5), terminal 200 waits until the next slot (slot #1 in FIG. 5) and then transmits the sTTI SR in the next slot.

More specifically, in FIG. 5, when an sTTI UL signal occurs during transmission of a UL signal in slot #0 which is an interval in which a certain reference signal is referenced in the long TTI, terminal 200 (transmission-power determining section 211) keeps constant the transmission power for the reference signal to be referenced in slot #0 and the long TTI UL signal while allocating no transmission power to the sTTI UL signal in slot #0. Terminal 200 then determines the transmission power values for the long TTI and sTTI UL signals so as to reduce the transmission power for the long TTI UL signal to allocate the transmission power to the sTTI UL signal in an interval which is subsequent to slot #0 and in which a different reference signal is referenced in the long TTI.

Note that, terminal 200 keeps the transmission power for the long TTI PUSCH constant even in an interval after the end of sTTI SR transmission in the slot in which the transmission power for the long TTI PUSCH is reduced to transmit the sTTI SR (slot #1 in FIG. 5). More specifically, PUSCH is transmitted with the reduced constant transmission power in slot #1. In this manner, it is made possible to avoid occurrence of a power difference between the reference signal to be referenced in slot #1 and the received data, thus allowing base station 100 to accurately demodulate the received data.

As described above, terminal 200 can switch transmission power for a long TTI UL signal in units of slots by not sharing a reference signal between slots for the long TTI and thus can slot in an sTTI UL signal. Moreover, the mapping of reference signals in order for base station 100 to perform demodulation processing independently for the respective slots makes it possible to reduce the impact on demodulation processing in the long TTI even when the sTTI is slotted in.

However, when there is no possibility of an sTTI UL signal and a long TTI UL signal being transmitted simultaneously, the transmission power for the long TTI is kept constant between slots while a reference signal is shared between the slots. With this configuration, the reference signals in both slots can be used in the demodulation processing in base station 100 when there is no possibility of an sTTI UL signal and a long TTI UL signal being transmitted simultaneously.

The second method is a method in which a data portion of PUSCH is partially punctured. Partially puncturing PUSCH means not to transmit PUSCH in some resource elements (REs) allocated to the PUSCH.

For example, terminal 200 determines the number of REs to be used for PUSCH transmission per symbol in accordance with the power amount for PUSCH which needs to be reduced for sTTI SR transmission. However, when PUSCH is transmitted using a single carrier, partially reducing a signal in the frequency domain causes an increase in peak to average power ratio (PAPR), which is considered a problem. Accordingly, terminal 200 needs to determine the number of REs to be used for PUSCH transmission taking into account the amount of increase in PAPR due to the signal reduction.

As a puncturing method, terminal 200 may achieve puncturing by puncturing the signal in the time domain before discrete Fourier transform (DFT) during generation of a signal to reduce the frequency resource for mapping of a signal after DFT.

Meanwhile, when the waveform of PUSCH is generated by single carrier transmission, and PUSCH is transmitted in a divided manner, terminal 200 may determine a puncturing target RE from one end of a division signal. In this way, the number of division parts of PUSCH does not change, so that an increase in PAPR can be suppressed.

Figure 6:
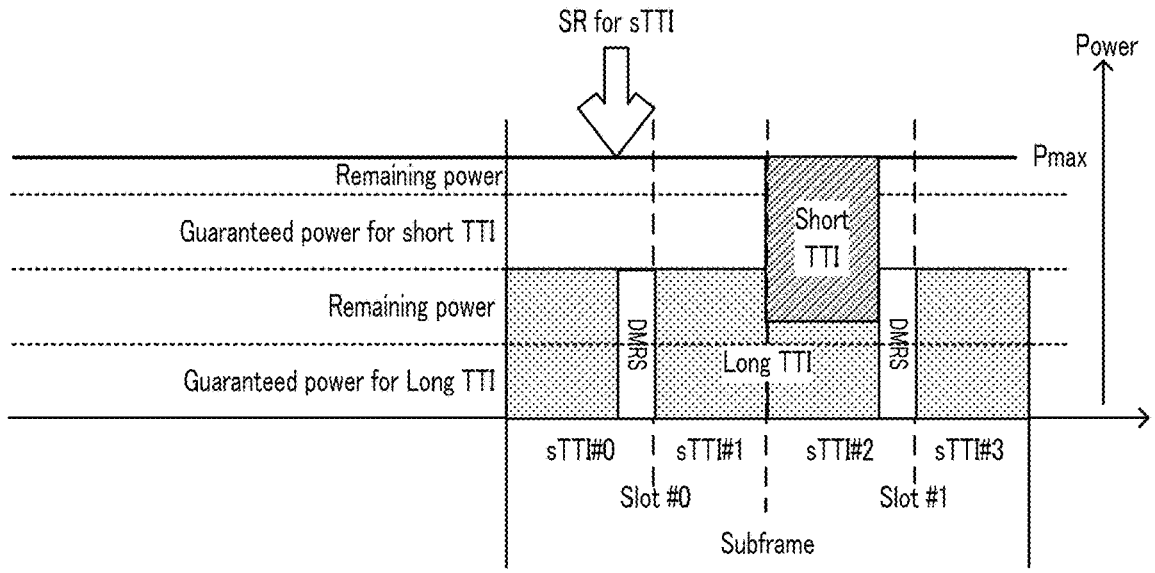
FIG. 6 is a diagram illustrating another example of the transmission power control according to Operation Example 1-1 of Embodiment 1.

Note that, as illustrated in FIG. 6, terminal 200 may map an sTTI SR to a symbol where the sTTI SR does not overlap with a long TTI DMRS. In FIG. 6, terminal 200 maps the sTTI SR to three symbols (the first to the third symbols) but does not map the SR to the fourth symbol where DMRS for the long TTI PUSCH is mapped in sTTI #2 composed of four symbols. With this configuration, terminal 200 can transmit DMRS after the end of sTTI transmission without puncturing the DMRS. Accordingly, base station 100 can accurately demodulate the PUSCH mapped in the rear of the slot (e.g., interval corresponding to sTTI #3 of FIG. 6), using the DMRS mapped to the center portion of the slot.

Note that, the power control methods appropriate to the respective channels are illustrated in Operation Example 1-1. However, switching between the multiple methods for the respective channels as a system makes the processing complex, which is considered a problem. In this respect, the methods may be integrated into a single method for the channels, and power control for the multiple channels may be performed using the single method. For example, as the power control method to be used in common among the multiple channels, terminal 200 may use a method in which the transmission power for a long TTI is changed in units of slots as described above.

In addition, for an sTTI SR, a transmittable sTTI may be limited. This is because securing the SR region using all the sTTIs increases resources unavailable to another UL channel, and these secured resources are not used when there is no actual SR transmission, thus degrading the resource utilization efficiency. In this respect, when SR transmittable sTTIs are defined, terminal 200 can secure the transmission power required for SR transmission after an SR occurs, and may wait until an SR transmittable sTTI and then transmit the SR in the sTTI. For example, in FIG. 5, when sTTI #2 is a non-SR transmittable sTTI, but sTTI #3 is an SR transmittable sTTI, terminal 200 reduces the transmission power for the long TTI UL signal in the interval from sTTI #2 and sTTI #3 corresponding to slot #1 in which the transmission power for the long TTI UL signal becomes changeable, without transmitting the SR in sTTI #2, and transmits the SR simultaneously with the long TTI UL signal in sTTI #3.

In addition, terminal 200 may transmit information on the remaining transmission power (Power Head Room (PHR)) to base station 100. In this case, terminal 200 may generate separate PHRs for a long TTI and an sTTI. In this case, the following methods are considered: a method in which a long TTI PHR is transmitted in a long TTI and an sTTI PHR is transmitted in an sTTI; and a method in which both long TTI and sTTI PHRs are collectively reported using either a long TTI or sTTI. When terminal 200 is to generate a PHR, terminal 200 needs to reference to the amount of resource allocated to UL data. For sTTIs, UL data is not necessarily transmitted in all sTTIs, and the amount of resource may vary for each sTTI. Accordingly, terminal 200 may previously determine which sTTI number is to be referenced when generating a PHR. Moreover, terminal 200 may reference to, when generating a PHR, the sTTI to which the largest amount of resource is allocated within the subframe.

Moreover, in the traditional systems such as LTE and LTE-Advanced, DCI format 3/3A or a bit in UL grant is used to perform closed-loop transmission power control. Terminal 200 can apply transmission power control similar to that of the traditional systems for TTI UL signals. Meanwhile, for sTTI UL signals, the power control information may be included only in some UL grants rather than being included in all UL grants. Furthermore, transmitting DCI format 3/3A separately for an sTTI, making DCI format 3/3A common between TTIs and sTTIs, or not applying power control using DCI format 3/3A to an sTTI are also possible.

Operation Example 1-2

Operation Example 1-2 assumes a normal LTE operation with an LTE system as the basis in a long TTI while each long TTI is set to 1 msec, which is the subframe length of LTE. In addition, in Operation Example 1-2, the sTTI length is set to two symbols and seven sTTIs are placed per subframe.

In Operation Example 1-2, an example will be described in which, during transmission of a long TTI UL signal (e.g., PUSCH/PUCCH) by terminal 200, an sTTI UL signal given a higher priority than this long TTI UL signal (e.g., SR) occurs as in Operation Example 1-1.

When an sTTI SR occurs during transmission of a long TTI UL signal, terminal 200 checks transmission power allocatable to the SR (remaining power). When determining that the transmission power required for SR transmission in a single sTTI is allocatable, terminal 200 transmits the SR at an optional timing.

Meanwhile, when the transmission power required for SR transmission in a single sTTI is not allocatable, terminal 200 transmits the SR in multiple sTTIs multiple times using the minimum guaranteed power and remaining power for sTTIs. The number of transmission times (number of sTTIs) of SR is set to the number of times that makes the total value of the transmission power for SR satisfy desired transmission power for SR. In other words, terminal 200 performs repetition transmission of SR using multiple sTTIs.

Figure 7:
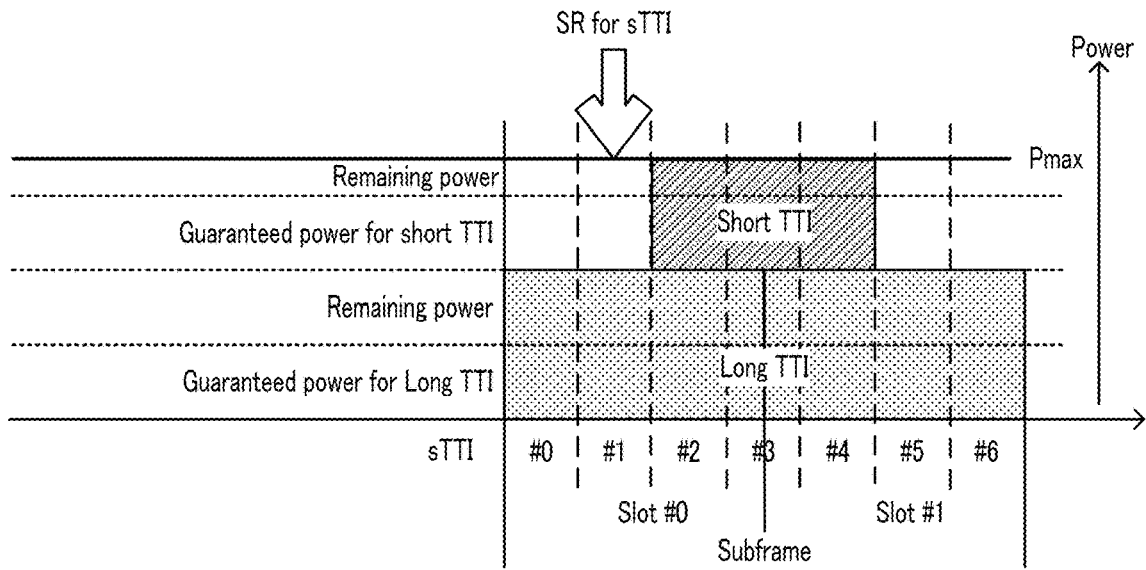
FIG. 7 is a diagram illustrating an example of transmission power control according to Operation Example 1-2 of Embodiment 1.

FIG. 7 illustrates a power distribution example of a long TTI and an sTTI according to Operation Example 1-2. In FIG. 7, an sTTI SR occurs in the interval of sTTI #1.

In this case, terminal 200 starts transmission of the sTTI SR from sTTI #2 subsequent to sTTI #1 in which the SR has occurred. In this case, for the sTTI SR transmission, terminal 200 uses the guaranteed power for short TTI allocated to sTTIs and the remaining power not used for long TTI transmission. In the example of FIG. 7, terminal 200 determines that three times of transmission (three sTTIs) satisfies the desired transmission power for SR and transmits the SR three times using sTTI #2, sTTI #3, and sTTI #4.

Base station 100 is aware that an sTTI SR may be transmitted over multiple sTTIs, and performs reception processing using a pattern in which multiple sTTI UL signals are combined.

As described above, in Operation Example 1-2, even when an sTTI UL signal occurs during transmission of a long TTI UL signal, the transmission power for the long TTI is changed only in units of subframes, so that the impact of sTTI transmission on the long TTI transmission is advantageously small. Moreover, in Operation Example 1-2, when an SR occurs, terminal 200 transmits the SR without waiting, so that it is possible to suppress delay in sTTI SR transmission can be suppressed. Furthermore, in Operation Example 1-2, the power of multiple sTTIs can be added together, which is particularly effective when the number of symbols for sTTIs is small.

Operation Examples 1-1 and 1-2 illustrating a case where UL signals are simultaneously transmitted in a long TTI and an sTTI have been described thus far.

As described above, in Embodiment 1, even when an sTTI signal occurs during transmission of a long TTI UL signal, terminal 200 transmits the sTTI UL signal even during the long TTI transmission while securing the reception quality of the long TTI UL signal. More specifically, according to Embodiment 1, power distribution can be appropriately performed when UL signals in different TTI lengths are transmitted. Accordingly, even when no allocation is given from base station 100 (i.e., base station 100 cannot make a prediction), and terminal 200 is to voluntarily transmit an sTTI UL signal as with SRs, it is possible to suppress delay in transmission of the UL signal. The suppressing of delay in SR transmission makes it possible to suppress a reduction in user throughput.

Figure 8:
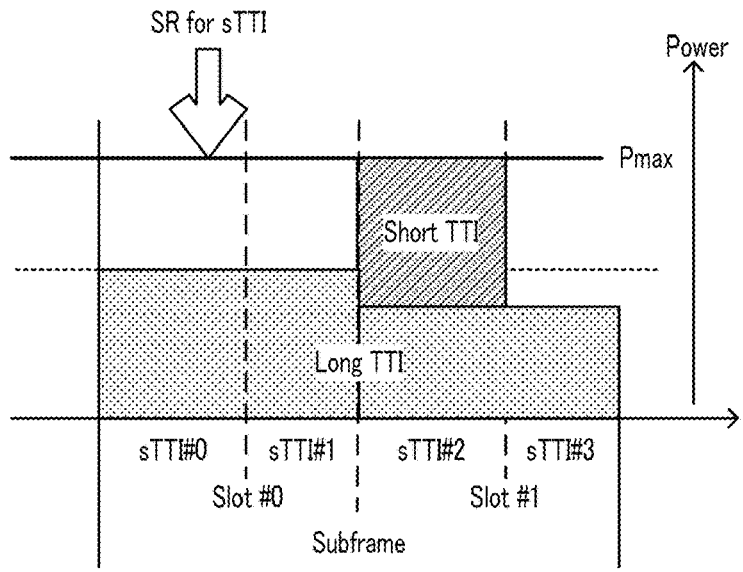
FIG. 8 is a diagram illustrating other transmission power control according to Operation Example 1-2 of Embodiment 1.

Note that, in Embodiment 1, a description has been given of the case where the minimum guaranteed power is allocated to sTTIs and TTIs, but the transmission power control according to Embodiment 1 can be applied even in a case where no minimum guaranteed power is allocatable. The case where no minimum guaranteed power is allocatable is a case where base station 100 indicates 0% as the minimum guaranteed power or no minimum guaranteed power is configured as a system. When no minimum guaranteed power is present, it is possible to use the power in such a way that all the power is used for sTTIs or TTIs. Accordingly, the range of increase and decrease of power when no minimum guaranteed power is present is large compared with the case where the minimum guaranteed power is present. Even when no minimum guaranteed power is present, as illustrated in FIG. 8, terminal 200 can secure the transmission power for an sTTI UL signal by reducing the transmission power for a long TTI UL signal during the transmission of the signal (in units of slots) as in Embodiment 1.

Moreover, in Embodiment 1, a description has been given of the example in which a DMRS is multiplexed in the time domain, but the present disclosure is not limited to this case. For example, even when a DMRS is multiplexed in the frequency domain, the transmission power for a UL signal in an interval in which the same DMRS is referenced is required to be constant. Accordingly, when reducing the power for the UL signal, terminal 200 may allocate, while securing the transmission power for the DMRS, within a symbol, the remaining power to the UL signal (e.g., sTTI SR) that is slotted in during transmission of the UL signal.

Embodiment 1 can be used when connection is actually established as dual connectivity. For example, a case is assumed where an MCG uses a TTI while an SCG uses an sTTI, or the like. In particular, when the MCG and SCG provide services using different bearers, respectively, the priority varies for each bearer, so that it is appropriate to apply Embodiment 1. Moreover, when the MCG supports both a TTI and an sTTI, and the SCG also supports both a TTI and an sTTI, dividing the minimum guaranteed power into four parts may be considered.

Embodiment 2

The basic configurations of a base station and a terminal according to Embodiment 2 are common to those of base station 100 and terminal 200 according to Embodiment 1, so that the base station and terminal according to Embodiment 2 will be described with reference to FIGS. 3 and 4.

In UL, when terminal 200 transmits UL signals using a TTI and an sTTI simultaneously, the total transmission power per symbol during transmission of the TTI UL signal increases or decreases depending on the presence or absence of transmission of an sTTI UL signal. When the transmission power increases or decreases, and the frequency resource is changed due to frequency hopping, a period in which distortion of a transmission waveform is permitted (referred to as "transient period") needs to be configured.

For example, in LTE and LTE-Advanced, a transient period of 20 µs is configured at the start and end of the transmission interval in which transmission power changes. Moreover, a transient period of a total of 40 µs is configured when the power changes in the middle of transmission although the transmission continues. In addition, in a subframe in which a sounding reference signal (SRS) is transmitted, a transient period is configured outside the SRS transmission period (i.e., not to overlap with the SRS interval) in order to protect the SRS.

However, the configuration of a transient period when sTTI transmission occurs in the middle of a subframe and the transmission power thus changes is not taken into consideration in LTE and LTE-Advanced. Accordingly, in Embodiment 2, a description will be given of the configuration of a transient period when sTTI transmission occurs in the middle of a subframe and the transmission power thus changes.

Hereinafter, a description will be given of Operation Examples 2-1 and 2-2 of base station 100 and terminal 200 according to Embodiment 2.

Operation Example 2-1

In Operation Example 2-1, a description will be given of at which position a transient period is configured when terminal 200 transmits long TTI and sTTI UL signals, simultaneously.

More specifically, in order to protect a high priority signal, overlapping between a high priority channel and a transient period is avoided. For example, when high priority channels are supposedly a DMRS and SRS each serving as an UL reference signal, terminal 200 configures a transient period that occurs due to sTTI transmission while avoiding a symbol to which a long TTI DMRS or SRS is mapped.

FIGS. 9A to 9D illustrate a configuration example of a transient period according to Operation Example 2-1. FIGS. 9A to 9D illustrate an example in which sTTIs obtained by dividing a TTI length into four parts are configured in case of 14 symbols per subframe with normal CP. The four sTTIs (sTTI #0 to sTTI #3) in a single subframe are composed of four symbols, three symbols, four symbols, and three symbols, respectively.

In addition, an assumption is made that a UL signal to be transmitted in a long TTI is PUSCH and a DMRS is mapped to the fourth OFDM symbol of each slot.

Figure 9A:
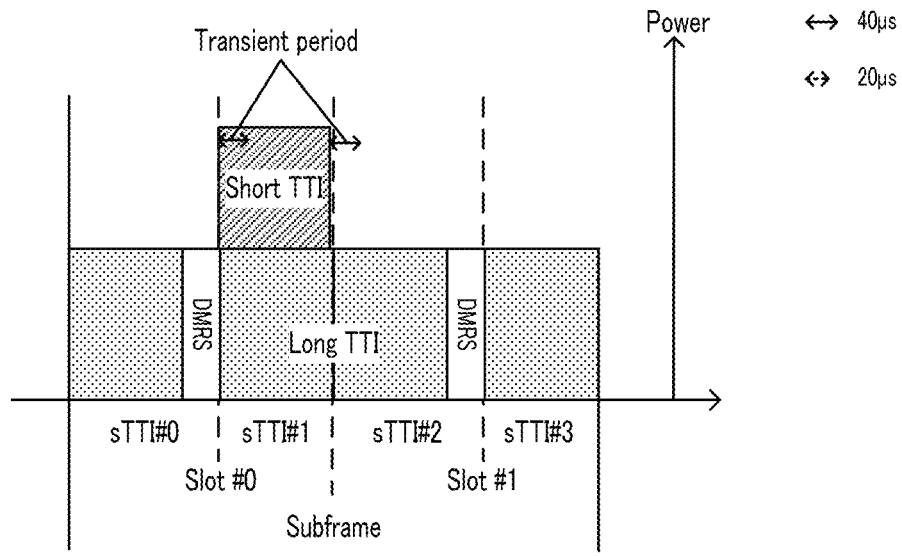
FIG. 9A is a diagram illustrating a configuration example of a transient period according to Operation Example 2-1 of Embodiment 2.

At this time, as illustrated in FIG. 9A, when a UL signal is transmitted in sTTI #1, a long TTI DMRS is mapped right before the transmission start symbol of sTTI #1. Accordingly, terminal 200 configures a transient period (40 μs) after transmission of a long TTI DMRS (within transmission interval of the sTTI UL signal). For this reason, distortion of a waveform needs to be permitted for both the sTTI and long TTI in the interval of the transient period on the symbols after DMRS (the interval of sTTI #1 in slot #0). Meanwhile, as illustrated in FIG. 9A, the symbol at which the transmission of sTTI #1 ends (the end symbol of sTTI #1) is not adjacent to the long TTI DMRS. Accordingly, terminal 200 configures a transient period (40 μs) after the sTTI transmission.

Figure 9B:
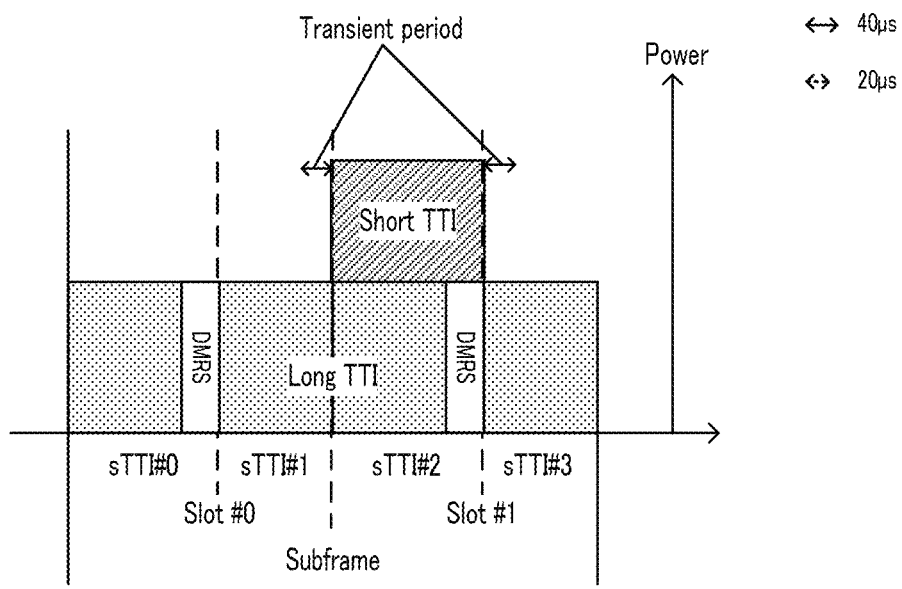
FIG. 9B is a diagram illustrating the configuration example of a transient period according to Operation Example 2-1 of Embodiment 2.

Next, as illustrated in FIG. 9B, when a UL signal is transmitted in sTTI #2, a long TTI DMRS is not mapped to the symbol right before the transmission start symbol of sTTI #2. Accordingly, terminal 200 configures a transient period (40 μs) before the transmission of sTTI #2 starts. Meanwhile, as illustrated in FIG. 9B, the end symbol of sTTI #2 overlaps with a long TTI DMRS. In this case, terminal 200 configures a transient period (40 μs) after the DMRS transmission (after sTTI transmission) in order to protect the DMRS.

Figure 9C:
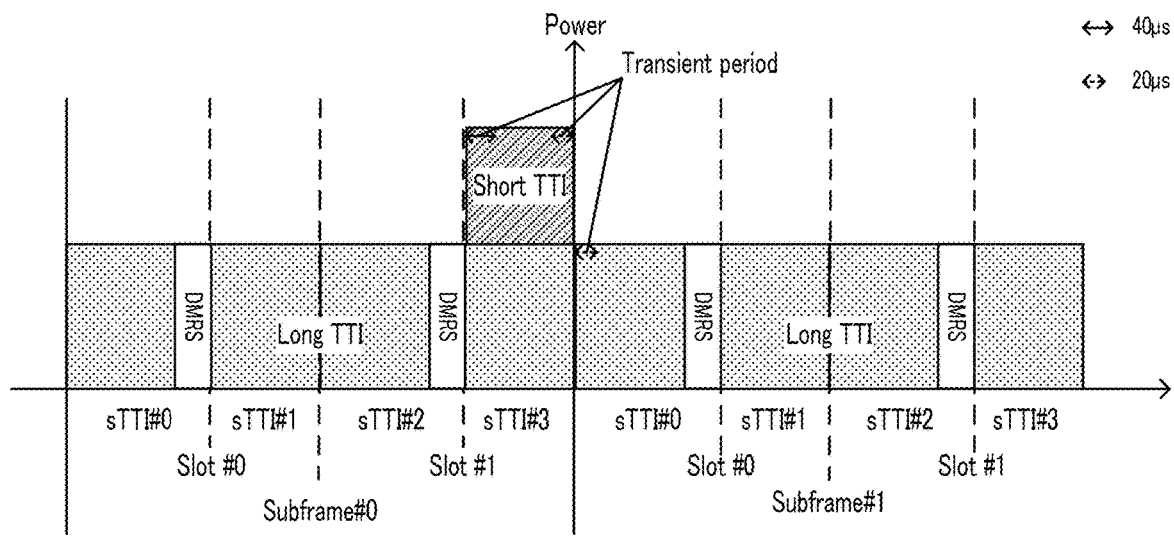
FIG. 9C is a diagram illustrating the configuration example of a transient period according to Operation Example 2-1 of Embodiment 2.

Next, as illustrated in FIG. 9C, when a UL signal is transmitted in sTTI #3, a TTI DMRS is mapped to the symbol right before the transmission start symbol of sTTI #3, so that, as in FIG. 9A, terminal 200 configures a transient period (40 μs) after the transmission of the long TTI DMRS (within the transmission interval of the sTTI UL signal). In addition, the rear end of sTTI #3 is positioned at the boundary between the subframes. In this case, terminal 200 configures transient periods (20 μs) before and after the boundary between the subframes when transmitting a UL signal with different transmission power in the next subframe.

Figure 9D:
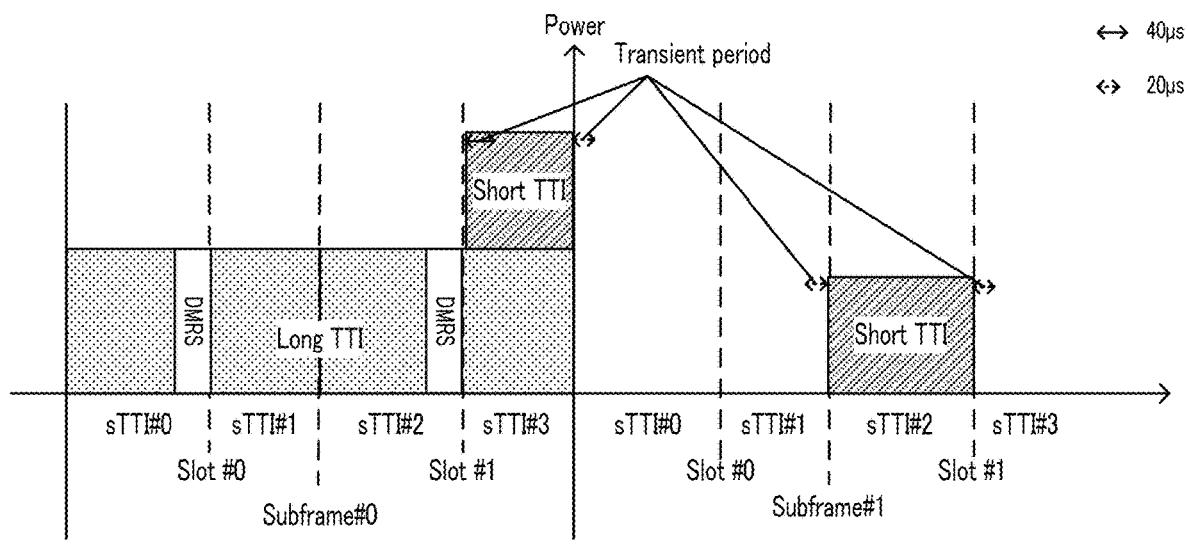
FIG. 9D is a diagram illustrating the configuration example of a transient period according to Operation Example 2-1 of Embodiment 2.

As illustrated in FIG. 9D, when a UL signal is transmitted in sTTI #3 positioned at the boundary between the subframes, and no UL signal is transmitted in the next subframe, terminal 200 configures a transient period (20 μs) after the boundary between the subframes (i.e., after completion of the transmission of sTTI #3).

As described above, when UL signals are simultaneously transmitted using a long TTI and sTTI in terminal 200, a transient period is configured in an interval other than a symbol where a high priority UL signal (SRS or DMRS) is mapped in a long TTI. Accordingly, high priority UL signals can be protected. In addition, it is also preferable to configure a transient period in an interval other than an sTTI interval where a UL signal is transmitted, in addition to the interval other than a symbol where a high priority UL signal is mapped. For example, when a transient period is configured in the sTTI interval where a UL signal is transmitted, the impact of distortion of a signal waveform due to the transient period is given to both of the sTTI and long TTI UL signals. Meanwhile, when a transient period is configured in an interval other than the sTTI interval where a UL signal is transmitted, distortion of a signal waveform due to the transient period has an impact only on a long TTI UL signal.

Figure 10:
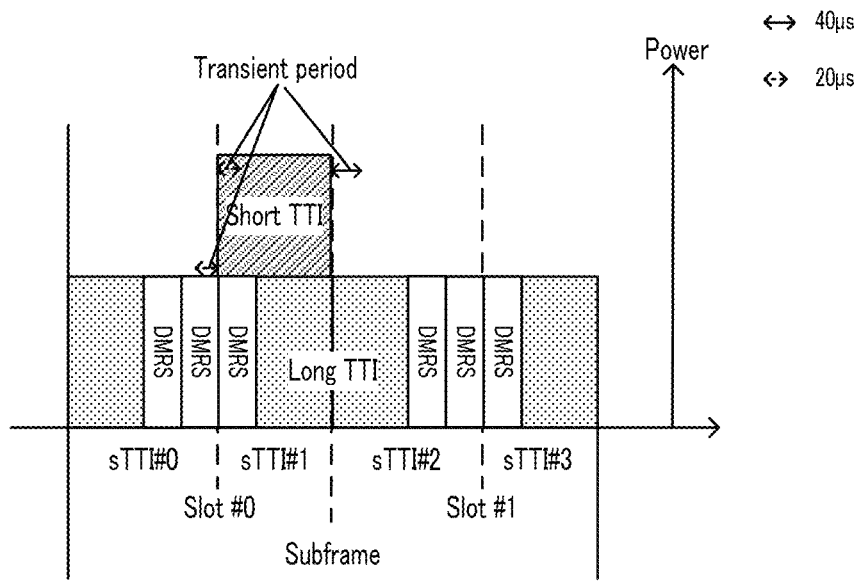
FIG. 10 is a diagram illustrating another configuration example of a transient period according to Operation Example 2-1 of Embodiment 2.

Note that, when TTI transmission is PUCCH format 1a/1b as illustrated in FIG. 10, a DMRS is mapped to the third, the fourth and the fifth symbols of each slot. At this time, when sTTIs are placed by dividing a subframe into four parts, the boundary between sTTIs (symbols before and after the boundary) may overlap with a long TTI DMRS (boundary between sTTI #0 and sTTI #1 and boundary between sTTI #2 and sTTI #3 in FIG. 10). In this respect, as illustrated in FIG. 10, when the boundary between sTTIs overlaps with the boundary between two long TTI DMRSs, transient periods (20 μs) may be configured before and after the boundary of the sTTIs in order to average the impact on the DMRSs due to the transient periods.

Operation Example 2-2

In Operation Example 2-1, a description has been given of the case where a long TTI DMRS is protected without taking into consideration the position of an sTTI DMRS (may be expressed as "sDMRS," hereinafter). Meanwhile, in Operation Example 2-2, the position of an sTTI DMRS is taken into consideration.

When a DMRS mapping position is an inner side of consecutive symbols within an sTTI (i.e., the mapping position is neither the start nor end symbol of the sTTI), the transmission power does not change before and after the symbol on which a DMRS is transmitted, for example, when the sTTI is composed of four symbols and the DMRS is mapped to the second or the third symbol while no an frequency hopping is assumed. In this case, no sTTI DMRS overlaps with the transient period.

Meanwhile, when a DMRS is mapped to the start or end symbol of an sTTI, the sTTI DMRS may overlap with the transient period. For example, when the DMRS is shared between sTTIs and the sTTI DMRS is aligned with the position of a long TTI DMRS, a DMRS is mapped at the boundary between sTTIs. More specifically, this case is where sTTI #0 is composed of the first to the fourth symbols while sTTI #1 is composed of the fourth to the seventh symbols, and a DMRS is mapped to the fourth symbol. At this time, the DMRS to be protected becomes common between the long TTI and sTTI, so that terminal 200 may configure a transient period so as to avoid overlapping with the DMRS mapping position as in Operation Example 2-1.

Figure 11:
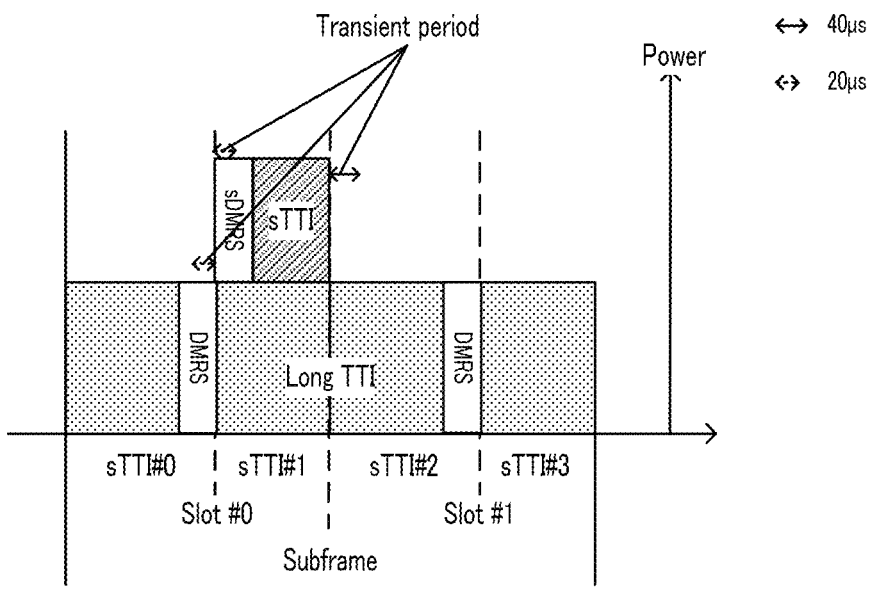
FIG. 11 is a diagram illustrating a configuration example of a transient period according to Operation Example 2-2 of Embodiment 2.

Meanwhile, when a DMRS is mapped always to the start of an sTTI as illustrated in FIG. 11, the position of an sTTI DMRS and the position of a TTI DMRS may be on consecutive different symbols. In this respect, as illustrated in FIG. 11, when the DMRS to be transmitted in sTTI #1 and the DMRS to be transmitted in a long TTI are consecutive, terminal 200 configures transient periods before and after the boundary between sTTIs in order to average the impact on the DMRSs due to the transient periods.

Moreover, when it is predetermined that a long TTI or short TTI is given priority, terminal 200 may configure a transient period while avoiding the interval of a DMRS in the TTI that is given priority. More specifically, terminal 200 may configure a transient period in the interval of an sTTI DMRS when a long TTI is given priority, and may configure a transient period in the interval of a long TTI DMRS when an sTTI is given priority.

Operation Examples 2-1 and 2-2 of base station 100 and terminal 200 according to Embodiment 2 have been described thus far.

Note that, a description has been given of the case where, as the value of a transient period, 20 μs is configured at the start and end of transmission of transmission power change, and a total of 40 μs is configured when the power changes in the middle of transmission although the transmission continues. However, the value of a transient period is not limited to these values.

Moreover, when frequency hopping is performed in an sTTI, a transient period needs to be configured before and after the frequency hopping. In this case, terminal 200 may configure a transient period so as to protect a high priority signal as in Operation Example 2-1 or 2-2.

Moreover, when only sTTI transmission is to be performed, different channels may be transmitted on different frequency resources between consecutive sTTIs. In this case, the priorities for the respective channels are predetermined such that DMRS=SRS>SR>ACK/NACK>CSI>PUSCH without UCI, and terminal 200 may configure a transient period such that the transient period does not overlap with transmission of a channel that is given priority.

Each embodiment of the present disclosure has been described thus far.

In the embodiments, a description has been given of the case where an assumption is made that a long TTI is set equal to the LTE subframe while a short TTI is the sTTI that has been under study in LTE-Advanced. However, multiple TTIs having different TTI lengths are not limited to the examples mentioned above, and a long TTI and sTTI may be TTIs used in different RATs, respectively. As the RATs, a large capacity communication, enhanced mobile broadband (eMBB), ultra-reliable and low latency communications (URLL), and multiple inter-machine communications, massive machine-type communications (mMTC), for example, may be considered. Meanwhile, LTE and LTE-Advanced are each considered as one of the RATs. Since TTI lengths appropriate to the respective RATs are different, TTI lengths may be different in accordance with RATs. Furthermore, TTI lengths may be respectively different for multiple systems within an RAT. In addition, an interval of 1 msec is called a subframe in the embodiments described above, but the interval is not limited to this. In a different RAT, an interval of 1 msec serving as the basis may be referred to as another name.

In the embodiments described above, a long TTI and sTTI may be physically allocated to the same component carrier or different component carriers. Accordingly, a long TTI PUCCH/PUSCH and an sTTI PUCCH/PUSCH may be physically transmitted simultaneously on the same component carrier. However, in view of transmission power control and data assignment, transmission power control is performed by handling a long TTI and an sTTI as different cells, and mapping of a UL control channel can be determined without any impact from another TTI channel with respect to each of the TTIs.

A system using a long TTI may be a system having a narrow subcarrier interval but a wide symbol interval, while a system using a short TTI (sTTI) may be a system having a wide subcarrier interval but a narrow symbol interval. In LTE and LTE-Advanced, when the subcarrier interval is 15 kHz in normal CP, 1 msec is divided into 14 symbols. For example, when the subcarrier interval is 60 kHz, a shorter symbol length can be configured, and the number of symbols to be fitted in 1 msec becomes large. In this case, it is made easier to configure a short TTI length. Accordingly, a long TTI is used when the subcarrier interval is narrow and a short TTI is used when the subcarrier interval is wide, and the embodiments can be applied to a terminal simultaneously using these TTIs for transmission.

Moreover, a description has been given of the case where the TTI (long TTI) is 1 msec in the embodiments described above, but the TTI length is not limited to this length, and the embodiments described above may be applied to a case where UL signals are simultaneously transmitted using TTIs having different TTI lengths.

The above embodiments have been described with an example in which an aspect of the present disclosure is implemented using a hardware configuration, but the present disclosure may also be implemented by software in cooperation with hardware.

In addition, the functional blocks used in the descriptions of the embodiments are typically implemented as LSI devices, which are integrated circuits having an input and output. The integrated circuits may control the functional blocks used in the descriptions of the embodiments and may include an input and output. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

A terminal according to the present disclosure includes: a transmission-power determining section that determines transmission power for an uplink signal in a first transmission time interval (TTI) (first TTI uplink signal) and an uplink signal in a second TTI shorter in TTI length than the first TTI (second TTI uplink signal), when the second TTI uplink signal occurs during transmission of an uplink signal in a first interval in which a first reference signal is referenced in the first TTI, so as to keep the transmission power for the first reference signal and the first TTI uplink signal constant without allocating any transmission power to the second TTI uplink signal in the first interval, and to reduce the transmission power for the first TTI uplink signal to allocate transmission power to the second TTI uplink signal in a second interval which is subsequent to the first interval in the first TTI and in which a second reference signal is referenced; and a transmission section that transmits the first TTI and the second TTI uplink signals using the determined transmission power.

In the terminal according to the present disclosure, the second TTI uplink signal is given a higher priority than the first TTI uplink signal.

In the terminal according to the present disclosure, the second TTI uplink signal is a scheduling request (SR).

In the terminal according to the present disclosure, when a modulation scheme used in the first TTI is a multilevel modulation scheme using amplitude, no reference signal is shared between the first interval and the second interval while the first TTI uplink signal is demodulated within each of the first interval and the second interval independently in a base station.

In the terminal according to the present disclosure, when the uplink signals are transmitted simultaneously using the first TTI and the second TTI in the terminal, a transient period is configured in an interval other than a symbol to which an uplink signal given a high priority is mapped in the first TTI.

In the terminal according to the present disclosure, the transient period is configured in an interval other than the second TTI in which the uplink signal is transmitted.

In the terminal according to the present disclosure, the uplink signal given a high priority is a sounding reference signal (SRS) or a demodulation reference signal (DMRS).

A communication method according to the present disclosure includes: determining transmission power for an uplink signal in a first transmission time interval (TTI) (first TTI uplink signal) and an uplink signal in a second TTI shorter in TTI length than the first TTI (second TTI uplink signal), when the second TTI uplink signal occurs during a first interval in which a first reference signal is referenced in the first TTI, so as to keep the transmission power for the first reference signal and the first TTI uplink signal constant without allocating any transmission power to the second TTI uplink signal in the first interval, and to reduce the transmission power for the first TTI uplink signal to allocate transmission power to the second TTI uplink signal in a second interval which is subsequent to the first interval in the first TTI and in which a second reference signal is referenced; and transmitting the first TTI and the second TTI uplink signals using the determined transmission power.

INDUSTRIAL APPLICABILITY

An aspect of this disclosure is useful in mobile communication systems.

REFERENCE SIGNS LIST

100 Base station
101 DCI generating section
102, 208 Error correction coding section
103, 209 Modulation section
104, 210 Signal assignment section
105, 212 Transmission section
106, 201 Reception section
107, 202 Signal demultiplexing section
108 ACK/NACK receiving section
109, 203 Demodulation section
110, 204 Error correction decoding section
200 Terminal
205 Error determination section
206 ACK/NACK generating section
207 DCI receiving section
211 Transmission-power determining section The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A terminal comprising:
circuitry, which, in operation, determines a first transmission power for a first uplink signal and a second transmission power for a second uplink signal by prioritizing allocation of a transmission power to the second transmission power for the second uplink signal, responsive to, in a first transmission time interval (TTI) where the first uplink signal is transmitted, the second uplink signal being transmitted in a second TTI that is shorter than the first TTI; and
a transmitter, which, in operation, transmits the first uplink signal with the determined first transmission power and transmits the second uplink signal with the determined second transmission power,
wherein a transient period for the second uplink signal is configured in a section other than the second TTI and other than a symbol to which an uplink signal with a high priority is mapped, and
wherein the uplink signal with a high priority is a sounding reference signal (SRS) or a demodulation reference signal (DMRS).

2. The terminal according to claim 1, wherein the second uplink signal is prioritized over the first uplink signal.

3. The terminal according to claim 1, wherein the second uplink signal includes a scheduling request (SR) or a hybrid automatic repeat request ACK (HARQ-ACK), and the first uplink signal is a physical uplink shared channel (PUSCH) without uplink control information.

4. The terminal according to claim 1, wherein the first TTI includes a first section and a second section, and a transmission power in the second section is changeable from a transmission power in the first section.

5. The terminal according to claim 4, wherein the second uplink signal is transmitted on the second section.

6. The terminal according to claim 5, wherein a reference signal is not shared between the first section and the second section.

7. The terminal according to claim 4, wherein a reference signal is not shared between the first section and the second section.

8. The terminal according to claim 1, wherein the first TTI includes a first section and a second section, each of which being a unit for which a transmission power is determined.

9. The terminal according to claim 8, wherein the second uplink signal is transmitted on the second section.

10. The terminal according to claim 8, wherein a reference signal is not shared between the first section and the second section.

11. A transmission method comprising:
determining a first transmission power for a first uplink signal and a second transmission power for a second uplink signal by prioritizing allocation of a transmission power to the second transmission power for the second uplink signal, responsive to, in a first transmission time interval (TTI) where the first uplink signal is transmitted, the second uplink signal being transmitted in a second TTI that is shorter than the first TTI; and
transmitting the first uplink signal with the determined first transmission power and transmits the second uplink signal with the determined second transmission power, wherein a transient period for the second uplink signal is configured in a section other than the second TTI and other than a symbol to which an uplink signal with a high priority is mapped, and wherein the uplink signal with a high priority is a sounding reference signal (SRS) or a demodulation reference signal (DMRS).

* * * * *